United States Patent [19]

Mattox

[11] 3,977,857

[45] Aug. 31, 1976

[54] METAL BONDING GLASS-CERAMIC COMPOSITIONS HAVING IMPROVED HARDNESS

[75] Inventor: Douglas M. Mattox, Pittsburgh, Pa.

[73] Assignee: Westinghouse Electric Corporation, Pittsburgh, Pa.

[22] Filed: Aug. 7, 1975

[21] Appl. No.: 602,706

Related U.S. Application Data

[62] Division of Ser. No. 410,655, Oct. 29, 1973, abandoned.

[52] U.S. Cl. ........................................ 65/33; 65/43; 65/49; 65/59 R; 106/39.7; 106/48; 156/89; 156/242; 174/137 R

[51] Int. Cl.² ........................................ C03B 32/00

[58] Field of Search ............... 65/33, 43, 49, 59 R; 156/89, 242; 106/39.7, 48; 174/137 R

[56] References Cited

UNITED STATES PATENTS 2,089,791 8/1937 Hammer ............................ 65/49
3,730,698 5/1973 Richardson et al. ................. 65/59 R

*Primary Examiner*—Edward G. Whitby
*Attorney, Agent, or Firm*—D. P. Cillo

[57] ABSTRACT

A metal member is coated with or embedded in a high-magnesia glass-ceramic material having the approximate composition of about 60 to 80 weight percent $SiO_2$, 12 to 20 weight percent $Li_2O$, 2 to 14 weight percent MgO, 1.5 to 6 weight percent $P_2O_5$, 1 to 7 weight percent of an alkali oxide selected from the group consisting of $K_2O$ and $Na_2O$ and their mixtures, 0 to 2 weight percent of a transition metal oxide selected from the group consisting of $Co_3O_4$, $MnO_2$, $Fe_2O_3$, $V_2O_5$ and $WO_3$ and their mixtures, 0 to 5 weight percent PbO, 0 to 2 weight percent $Al_2O_3$ and 0 to 1 weight percent $As_2O_3$.

7 Claims, 2 Drawing Figures

METAL BONDING GLASS-CERAMIC COMPOSITIONS HAVING IMPROVED HARDNESS

This is a division of application Ser. No. 410,655, filed Oct. 29, 1973, now abandoned.

BACKGROUND OF THE INVENTION

Glasses and porcelains have been used as an insulation for a metal member in bushing applications for capacitors and pole-type power transformers, and as vacuum interrupter enclosures, lightning arrester housings, electric line insulators, and in many specialty applications as an insulating material. The insulating material-metal conductor seal is accomplished in a variety of ways; usually by preglassing, the metal component with, for example, borax glasses or $SiO_2$—$PbO$—$K_2O$ or $SiO_2$—$Li_2O$—$ZnO$—$B_2O_3$ systems, or by using an intermediate metallic sheath member which slides over and contacts the metal conductor. The sheath is easily bonded to the glass or porcelain and is also easily bonded to the metal but is an expensive component of the system. Direct bonding of porcelain to conductor is not practical because of the low reactivity between porcelain and normal conductor metals. Glass embedment is usually impractical because of thermal expansion mismatches between insulator glasses and economical conductors. However, adequate bonding has been accomplished in both cases with nickel-iron alloy intermediate sheath members.

With the development of the glass-ceramic process, a whole new avenue of material applications emerged, whereby glass technology could be employed in the initial forming of an article, such as an insulated bushing, and then a subsequent, special heat treatment would convert the glass article to a crystalline oxide material dispersed in a glass matrix, the composite normally having improved properties. The ability to regulate the crystallizing phase by composition and heat treatment permits the adjustment of physical properties, such as coefficient of thermal expansion and hardness, to suit the application.

while glass-ceramic insulating compositions can be adjusted to adequately match the expansion characteristics of economical conductors, generally the bond strength in glass-ceramic embedments and coatings is quite poor when compared to glass enamel bonding. The strength of such embedments comes from the mechanical interlocking of the metal part in the rigid glass-ceramic, and only in small degree from glass-ceramic to metal interaction.

Glass-ceramic compositions are well known in the art, and are taught by Chen in U.S. Pat No. 3,006,775 and McMillan et al in U.S. Pat. No. 3,379,542 as an insulating material, where high strength must be coupled with good electrical insulating properties. The bonding of such compositions to pre-glassed metal components is taught by McMillan et al in U.S. Pat. No. 3,220,815. However, new ways of improving adherence and hardness in these systems, while still maintaining thermal expansion matching to suitable metal conductors are desirable.

SUMMARY OF THE INVENTION

A metal member, generally having a relatively smooth oxidized surface and a coefficient of thermal expansion between about 8 to $18 \times 10^{-6}$, but preferably between about 8 to $13 \times 10^{-6}$ in/in/°C, is directly bonded to or directly embedded in an electrically insulating, extremely hard, high-magnesia glass-ceramic material, without an intermediate metal sheath layer. The glass-ceramic is a substantially homogeneous micro-crystalline mass of ceramic, having a Knoop hardness of over about 660 and preferably over 675, in a glass matrix, and having the approximate composition on an oxide basis of about 60 to 80 weight percent $SiO_2$, 12 to 20 weight percent $Li_2O$, 2 to 14 weight percent $MgO$, 1.5 to 6 weight percent $P_2O_5$, 1 to 7 weight percent of at least one alkali oxide selected from the group consisting of $K_2O$ and $Na_2O$, 0 to 2 weight percent of at least one transition metal oxide selected from the group consisting of $Co_3O_4$, $MnO_2$, $Fe_2O_3$, $V_2O_5$ and $WO_3$, 0 to 5 weight percent $PbO$, 0 to 2 weight percent $Al_2O_3$ and 0 to 1 weight percent $As_2O_3$.

The glass-ceramic is bonded to the metal member, which can be, for example, a stud for a lightning arrester or a conductor for a bushing, by forming a molten glass having the approximate same composition as the final glass-ceramic; applying the molten glass directly to the metal member, preferably in a suitable mold; cooling the glass to a temperature of below about 600°C, preferably between about 450°–600°C; heating the glass and metal member up to a temperature of about 900°C, preferably between about 800°–900°C at a rate of about 10°–80°C per hour, to form a glass-ceramic from the glass composition which intimately and strongly bonds to the metal member; maintaining the temperature of the glass-ceramic and metal member at about 800°C–900°C for about ½ to 10 hours, and then cooling the glass-ceramic and metal member to room temperature.

BRIEF DESCRIPTION OF THE DRAWINGS

For a better understanding of the invention, reference may be made to the exemplary embodiment, shown in the accompanying drawings, in which.

DESCRIPTION OF THE PREFERRED EMBODIMENTS

Figure 1:
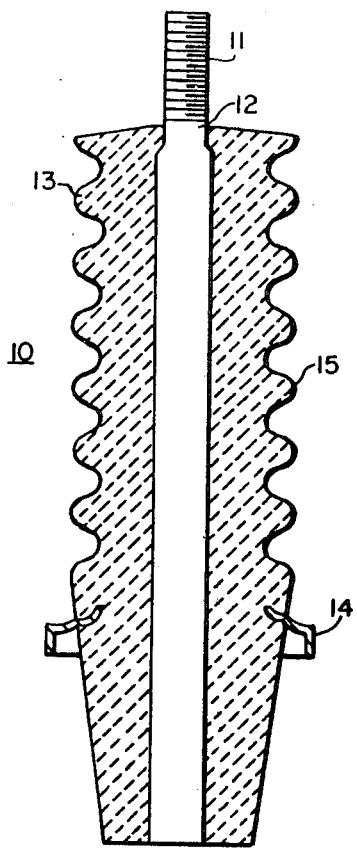
FIG. 1 shows a cross-sectional view of a bushing comprising a smooth surfaced metal conductor directly embedded in a rigid glass-ceramic, formed from a highly reactive glass-ceramic insulating composition, with attached metal fittings.

In applications where glass-ceramic embedment strength comes from the mechanical interlocking of the metal part in the rigid glass-ceramic materials, the compositions and methods of bonding are not particularly critical. In applications where relatively smooth metal surfaces are to be embedded or coated, or where mechanically interlocked designs are not feasible, then the ingredients and their ranges in compositions, the oxidation state of the metal surface, the atmosphere used and the method of casting compositions becomes critical.

Compositionally it was not thought possible to deviate substantially from the standard $Al_2O_3$—$SiO_2$—$Li_2O$ glass-ceramic system used to embed metal members, since there would be the possible introduction of new phases of different thermal expansion characteristics, which would increase the metal to glass-ceramic seal stresses in bushings and other articles. The compositional changes tolerable are those which affect only the glassy phase. Thus only certain components could be added which would significantly heighten the reactivity of the glassy phase without altering the subsequent crystallization of the system. The method of casting the glass-ceramic compositions must also take into account many complex factors, such as the state of oxidation of the metal surface along with critical temperature and time requirements.

In this invention a glass melt is heated to opacify it by the eventual formation and growth of crystallites of lithium disilicate. The initiation of such crystallization depends upon the preliminary nucleation and formation of submicroscopic particles of lithium phosphate throughout the glass, which in turn provide nucleation points for formation and growth of lithium metasilicate crystallites. It is essential that the crystals, formed by heating the glass melt, shall be so numerous and in such close juxtaposition as to provide a rigid structure, which will support the article against deformation or slumping even though its glassy matrix may be softened.

The following compositions, calculated from their batches to the oxide basis in approximate parts by weight, are examples of lithium magnesium silicate glasses, which are suitable for carrying out the above described process, to produce a glass-ceramic product of substantially the same average composition.

According to the present invention, a glass melt and subsequently crystallized glass-ceramic product consists essentially of about 60 to 80 weight percent $SiO_2$; about 12 to 20 weight percent $Li_2O$; about 2 to 14 but preferably 4 to 12 weight percent $MgO$; about 1.5 to 6 but preferably 2 to 4 weight percent $P_2O_5$; about 1 to 7 weight percent of an alkali oxide selected from $K_2O$ and $Na_2O$ or their mixtures; about 0 to 2 but preferably 0.3 to 0.5 weight percent of a transition metal oxide selected from $Co_3O_4$, $MnO_2$, $Fe_2O_3$, $V_2O_5$ and $WO_3$ or their mixtures; about 0 to 5 but preferably 0.5 to 2 weight percent $PbO$; about 0 to 2 weight percent $Al_2O_3$ and about 0 to 1 weight percent $As_2O_3$.

The glass-ceramic formed has a thermal expansion coefficient over the range 20°–500°C of between about 10.0 to 11.5 $\times$ $10^{-6}$ in/in/°C and a modulus of rupture of about 40,000 lb/sq.in. This ceramic is a good electrical insulator, having a dielectric loss angle of about 1.25° at frequencies of about 1 mc/s. The dielectric constant for this range of frequencies is about 5.4. The glass ceramic formed is also surprisingly hard, having a hardness value of over about 660 and generally about 675, as measured by the Knoop hardness test. The Knoop hardness test is standard in the metal and glass industry wherein a tiny diamond indentor measures the hardness of the material.

The batch ingredients as powdered raw materials are weighed, mixed and placed in a refractory crucible or other suitable high temperature container. The mixture is heated to a temperature of between about 1000° to 1500°C, generally by electrical means, such as inserting molybdenum bar electrodes or heating in a furnace containing silicon carbide resistive heating elements. The mixture is held at this temperature for about 4 to 40 hours, after which the materials have become homogenized and formed into a glass.

The molten glass is then cast into a static or centrifugal type steel or graphite mold which will be preferably preheated to between about 400° to 900°C. The mold contains a metal member, preferably very thinly preoxidized and/or pre-glassed, such as a copper or steel alloy conductor, having a coefficient of thermal expansion of between about 8 to 18 $\times$ $10^{-6}$ but preferably between about 8 to 13 $\times$ $10^{-6}$ in/in/°C. The metal member is preferably preheated to a temperature of between about 400° to 900°C. The temperature of the glass as it contacts the hot metal member in the mold will be between about 650° to 1100°C but preferably between about 700°–900°C. Of course, the metal member may be coated by other suitable techniques well known in the enameling art when only a coating or enamel layer is to be applied. Also, in some cases the metal member may be oxidized and/or heated in place by the heat from the mold, rather than being preheated and pre-oxidized before being placed in the mold.

The cast, transparent glass is allowed to cool around the metal member to between about 450°–600°C, in an air atmosphere, to form a thick semi-rigid glass insuing article. The mold, if one is used, is opened and the metal member with surrounding glass coating or housing is placed in a recrystallizing furnace at a temperature of about 450°–600°C. If the glass coated metal member is placed in the furnace at over about 600°C, the ceramic will not have sufficient time to crystallize and the insulation will slump.

The glass coated metal member is gradually heated, in an air atmosphere, with a continuous increase of temperature at a rate of about 10°–80°C per hour, without stopping, so that crystal growth is not arrested, until a glass temperature of between about 800°–900°C is reached. Above this rate the glass phase softens faster than crystallization takes place causing the piece to slump. At lower rates excessive oxidation of the exposed metal takes place. Applying temperatures over about 900°C will cause degrading and localized melting of the insulation.

During the continuous rate gradient heating, at about 500°–550°C, crystals of lithium phosphate form, induced by the system's nucleating agent. Then, at about 600°C, crystals of lithium metasilicate start to form on the lithium phosphate nucleation points along with some lithium disilicate crystals. Crystals of lithium disilicate are then formed by reaction between the lithium metasilicate and the glass matrix.

The viscosity of the material remains somewhat constant due to the crystallization temperature depleting the glassy phase in the formation of crystals, while the heating causes the glassy phase to become more fluid as the temperature rises. At about 800°C the crystal growth continues at an accelerated rate and the glass becomes an opaque, substantially homogeneous microcrystalline mass of synthetic ceramic, in a feldspathic glass matrix comprising the uncrystallized portion of the mass. The glass-ceramic coated metal member is held at a temperature of between 800°–900°C for about ½ to 10 hours to insure maximum crystallization, and then allow to cool to room temperature over about a 6 to 48 hour period. The final recrystallization temperature should not exceed 900°C or the crystals constituting the ceramic phase may begin to remelt.

The glass matrix can comprise about 5 to 80 volume percent of the glass-ceramic material but will preferably be only about 5 to 40 volume percent, i.e., about 60–95 volume percent ceramic crystals. The approximate diameter of the individual lithium disilicate crystals in the glass matrix will be about 0.2–2 microns. These crystalline ceramic materials have desirable properties which are different from the properties of their original glasses. Due to closely knit, interlocked relationship of the crystals, as a result of being formed in situ, the breaking strength is 2 to 4 times greater than the original glass.

The MgO (magnesia) is used as a major component in the system, and is essential to provide the superior outdoor weathering, shatter resistance and abrasion resistance necessary for electric line insulators, lightning arresters and bushing insulators. The MgO imparts exceptional Knoop hardness and shatter resistance to the insulating material. This latter property is especially important since electric line insulators and lightning arresters are frequently shot at by hunters.

The $P_2O_5$ is a nucleating agent essential to catalyze crystallization of the lithium phosphate which serves as nuclei and crystallization point for lithium metasilicate and lithium disilicate crystallization. The $P_2O_5$ is not used as a glass flux to improve glass melting properties, but is necessary to promote homogeneity of crystallization, and is required for dimensional stability in the article. Compositions containing $P_2O_5$ within the ranges set forth above will uniformly crystallize, while those compositions containing below 1.5 weight percent $P_2O_5$ will randomly crystallize. Values over 6 weight percent will cause inhomogeneous crystallization, leaving a mottled, bumpy surface. The $P_2O_5$ is essential to prevent slumping or deformation in the casting during the gradient recrystallization step.

The alkali oxide is essential to balance and match the coefficients of thermal expansion of the glass-ceramic material to the metal member which it insulates by offsetting the high expansion of the crystal phase with a low expansion glass phase to prevent seal stress cracking. It also improves the metal wetting behavior of the glass during casting and promotes crystallization by its effect on viscosity. This component is important because the ceramic to metal bond is produced at high temperatures and thermal expansion matching is a necessity.

The transition metal oxides are reactive metal adherence promoting additions. Particularly useful is $Co_3O_4$ in amounts below 0.5 weight percent to heighten the reactivity of the glassy phase without altering the crystallization of the system. These materials while not essential, are particularly useful when a very thin oxide layer is used on the metal part to be embedded.

Bonding is helped by an oxide layer on the metal part, but in many cases this oxide does not have good adherence to the parent metal, and in many cases the strength of the glass-ceramic to metal bond is inversely related to the thickness of the oxide layer. Preferably, a heating process with a controlled humidity atmosphere is used to deposit a thin, dense, highly adherent, 0.8–10 micron oxide layer on the metal part to be coated. The use of these transition metal oxide materials may eliminate the expense and need of the controlled pre-oxidation step, and allow very thin oxides formed only by the heat of the mold to be sufficient for bonding. The preglass layer, if one is used to help bonding will also be a thin, up to about 125 microns, coating applied or fused to the oxide layer.

The $Al_2O_3$ is not used as a major component of the composition, but may be used in small amounts as $Al(PO_3)_3$ to allow ease of introduction of the $P_2O_5$ into the glass system. The PbO is a fluxing agent which extends glass working characeristics, helps regulate viscosity, and also improves the wetting behavior of the glass during casting. The $As_2O_3$ is a fining agent which speeds removal of bubbles during melting.

Referring now to FIG. 1 of the drawings, a bushing is shown as 10. The copper, steel or stainless steel conductor 11 is shown having a smooth surface 12 which may be oxidized and/or pre-glassed with a very thin glass coating as is well known in the art. The conductor does not contact a metal sheath but is directly and intimately bonded to the glass-ceramic insulator casting 13. Also shown are metal fittings 14, such as flanges and end cups, embedded in the casting during molding and water sheds 15.

Figure 2:
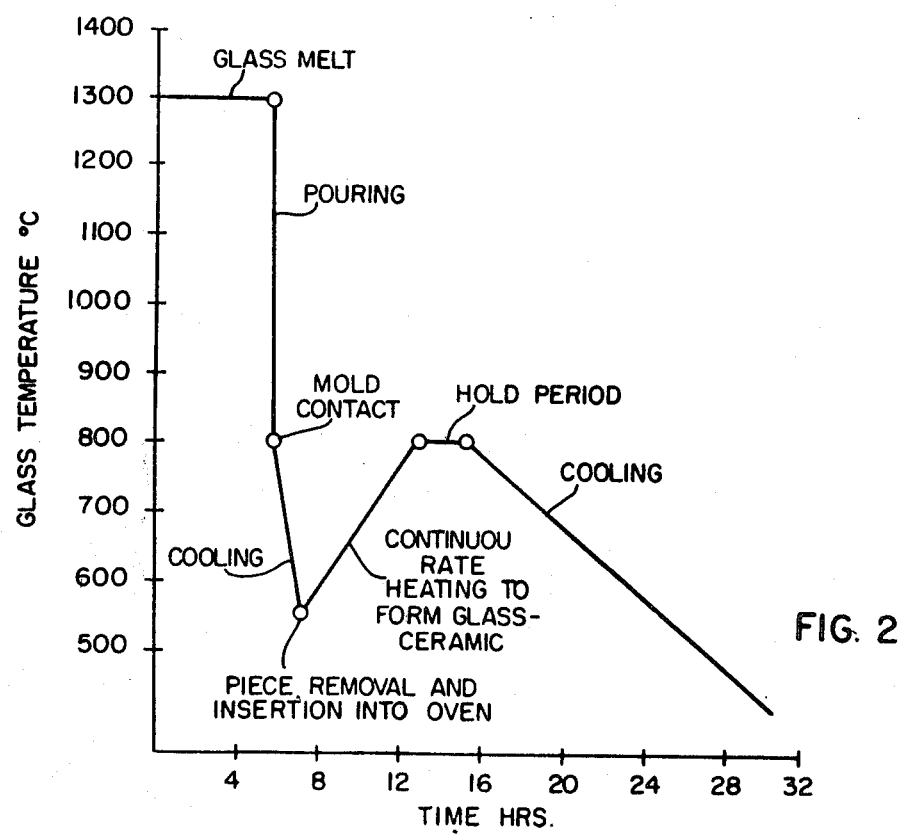
FIG. 2 shows a graph of the preferred heat treating schedule of this invention, to convert the glass melt to a crystalline ceramic in a glassy matrix.

FIG. 2 shows a graphical representation of the preferred heating schedule followed in the method of this invention.

EXAMPLE 1

A glass ceramic plug insulator with embedded stud was made. A batch of powdered ingredients was mixed containing 230.1 gr. $SiO_2$, 44.1 gr. $Li_2CO_3$, 26.3 gr. $MgCO_3$, 12.0 gr. $NH_4H_2PO_4$, 6.8 gr. $K_2CO_3$ and 5.0 gr. PbO. This batch material yielded a glass melt material consisting by weight on the oxide basis of about 71 weight percent $SiO_2$, 13.6 weight percent $Li_2O$, 8.1 weight percent MgO, 3.7 weight percent $P_2O_5$, 2.1 weight percent $K_2O$ and 1.5 weight percent PbO. The final glass-ceramic material will have approximately the same composition.

The batch materials were placed in a silica crucible and placed in a furnace operating at a temperature of about 1320°C, and containing silicon carbide resistive heating elements, to melt the batch materials and form a fluid, molten glass having a temperature of about 1320°C. The melt was stirred at ½ hour intervals and left in the furnace for 6 hours.

The molten glass composition was then allowed to cool to about 1260°C, and was then poured into a graphite split mold with a 1½ inch inside diameter by 2 inch main cavity and a ½ inch inside diameter × 1 inch hole in the bottom. A ½ inch × 1½ inch metal bolt, with a ⅜ inch tapered end, was inserted in the hole in the mold.

The metal bolt was a high expansion type 18-8 stainless steel. This stainless steel in similar to type 304 stainless, and has a coefficient of thermal expansion of about $17.3 \times 10^{-6}/°C$ and an annealing temperature range of about 1010°–1121°C. The bolt was sandblasted and preheated to about 820°C for 15 minutes, to form a thin oxide layer of approximately about 5–10 microns on the smooth bolt surface, before insertion in the mold which was preheated to about 570°C. After insertion of the bolt, the molten glass was immediately poured into the mold. The temperature of the glass as it contacted the mold and bolt was approximately 800°C.

The graphite mold and casting were then placed in an oven operating at about 560°C to allow the glass to further cool. After about 10 minutes the mold was taken from the oven and removed from the glass casting. The glass housing with embedded stainless steel bolt, having a temperature of about 550°C, was then reinserted into the oven and the oven temperature raised so that the glass temperature would continuously increase at a rate of about 40°C/hr. to a final temperature of 830°C. The 280°C temperature increase was brought about at a continuous gradual rate over 7 hours without stopping, so that crystal growth was not arrested.

During this time crystals of lithium phosphate and lithium metasilicate formed. Then at about 750°C crystals of lithium disilicate ($Li_2O.2SiO_2$) formed. Almost all the crystallization occurred before the temperature reached 830°C, and the glass was converted into a substantially homogeneous micro-crystalline mass of about 85 volume percent ceramic in a glass matrix. The specimen was held at 830°C for 2 hours and then cooled to 25°C over a 16 hour period. The entire process was carried out without the use of an inert atmosphere.

The resulting opaque glass-ceramic housing with attached stainless hardware was not deformed or slumped in any way. The use of $P_2O_5$ nucleating agent is primarily responsible for this characteristic. The glass-ceramic ($Li_2O$—$MgO$—$SiO_2$) system had a coefficient of thermal expansion of about $11 \times 10^{-6}$ in/in/°C. The stainless steel stud was intimately attached to the top of the housing and there were no cracks in evidence. The $Na_2O$ is primarily responsible for this characteristic by balancing the coefficient of thermal expansion and improving the wetting behavior of the composition in the glassy phase.

One exceptional feature of the glass-ceramic housing was its extreme hardness, the ceramic portion of which was measured and which averaged 680 on the Knoop scale. The MgO is primarily responsible for this characteristic. This provides excellent abrasion resistance, imparts superior shatter resistance and makes these housings uniquely suitable for outdoor use. Most $Al_2O_3$—$Li_2O$—$SiO_2$ systems, for example one containing 4.0 weight percent $Al_2O_3$, 15.3 weight percent $Li_2O$, 74.2 weight percent $SiO_2$, 2.4 weight percent $K_2O$, 2.0 weight percent $P_2O_5$, 1.6 weight percent PbO, 0.4 weight percent $As_2O_3$, and 0.02 weight percent $Co_3O_4$, show a ceramic portion Knoop hardness of 640, almost a whole step on the Moh's hardness scale below the 680 value attained by the material of this invention.

The glass-ceramic ($Li_2O$—$MgO$—$SiO_2$) provided high mechanical strength, high mechanical shock resistance, high thermal shock resistance, severe weathering durability, a nondegradable ceramic surface finish, excellent electrical insulating characteristics, such as a high dielectric strength of about 400 volts/mil, and it would be applicable to many different kinds of stainless steel or other suitable metal embedments, as well as stainless steel enameling and stainless steel sealing processes. Stainless steel such as type 430, having a coefficient of thermal expansion of about $10.4 \times 10^{-6}$/°C, would provide much better thermal matching and so provide even better bonding and allow hermetic sealing of glass-ceramic to metal.

EXAMPLE 2

A glass-ceramic plug insulator housing with an embedded stud was made. A batch of powdered ingredients was mixed containing 230.1 gr. $SiO_2$, 108.9 gr. $Li_2CO_3$, 55.2 gr. $MgCO_3$, 19.5 $NH_4H_2PO_4$, 10.0 $K_2CO_3$ and 5 gr. PbO. This batch material yielded a product glass-ceramic material consisting of 74.7 weight percent $SiO_2$, 14.3 weight percent $Li_2O$, 4.8 weight percent MgO, 2.4 weight percent $P_2O_5$, 2.1 weight percent $K_2O$ and 1.7 weight percent PbO. The batch ingredients were melted to form a fluid glass as in EXAMPLE 1.

The molten glass composition was allowed to cool as in EXAMPLE 1 and then poured into a preheated graphite split mold containing a type 18-8 preheated, oxidized stainless steel bolt, using the same techniques as in EXAMPLE 1. The graphite mold and casting were then cooled, and the glass casting with embedded stainless steel bolt reinserted into the oven using the same times and temperatures and continuous gradual heating gradient as in EXAMPLE 1. The resulting glass-ceramic ($Li_2O$—$MgO$—$SiO_2$) system was a substantially homogeneous micro-crystalline mass, about 85 volume percent ceramic in a glass matrix, and had a coefficient of thermal expansion of about $11 \times 10^{-6}$ in/in/°C.

The resulting opaque glass-ceramic housing with attached stainless hardware was not deformed or slumped in any way. The stainless steel stud was intimately attached to the top of the housing and there were no cracks in evidence.

Reflected light microscopic examination of a sample of this glass-ceramic showed a dominant phase of ceramic crystals and a matrix glass phase. Hardness measurements were taken and averaged at 675 for the ceramic crystal phase. Other samples were submitted for X-ray diffraction anaylsis and the results indicated the ceramic phase to be primarily $Li_2O \cdot 2SiO_2$ crystals.

The same batch composition, glass melting, glass pouring, cooling and crystallization steps were followed in making a glass-ceramic bushing, incorporating an embedment of the type 430 stainless steel having a coefficient of thermal expansion of about $10.4 \times 10^{-6}$ in/in/°C, with an associated flange, end cup and skirt. The batch composition was melted in a volume large enough to provide 1000 grams of glass and poured at a melt temperature of 1316°C into a specially constructed axially symmetric graphite bushing well mold. The glass was allowed to equilibrate in the furnace at 550°C for 20 minutes before removing the mold and subjecting the casting to the heat treatment described in EXAMPLE 1.

The resulting opaque glass-ceramic bushing was without flaw and the embedment ans associated hardware were extremely well bonded and intimately attached and sealed. The success of this casting suggested that the $Li_2O$—$MgO$—$SiO_2$ system was an excellent substitute for $Li_2O$—$Al_2O_3$—$SiO_2$ systems.

EXAMPLE 3

A batch of powdered ingredients (Batch A) was mixed containing 121.2 gr. $SiO_2$, 56.7 gr. $Li_2CO_3$, 7.0 gr. $MgCO_3$, 8.0 gr. $K_2CO_3$, 7.2 gr. $Al(PO_3)_3$, 0.4 gr. $As_2O_3$ and 0.1 gr. $Co_3O_4$. This batch material yielded a product glass ceramic material consisting of 75.5 weight percent $SiO_2$, 14.3 weight percent $Li_2O$, 2.0 weight percent MgO, 3.4 weight percent $K_2O$, 0.9 weight percent $Al_2O_3$, 3.6 weight percent $P_2O_5$, 0.2 weight percent $As_2O_3$ and 0.06 weight percent $Co_3O_4$. As a comparative example a second batch of powdered ingredients (Batch B) was mixed containing 104.7 gr. $SiO_2$, 49.1 gr. $Li_2CO_3$, 51.6 gr. $MgCO_3$, 6.9 gr. $K_2CO_3$, 6.2 gr. $Al(PO_3)_3$, 0.3 gr. $As_2O_3$ and 0.1 gr. $Co_3O_4$. This batch material yielded an excessively high MgO product glass ceramic material consisting of 65.4 weight percent $SiO_2$, 12.4 weight percent $Li_2O$, 15.2 weight percent MgO, 2.9 weight percent $K_2O$, 0.7 weight percent $Al_2O_3$, 3.1 weight percent $P_2O_5$, 0.2 weight percent $As_2O_3$ and 0.06 weight percent $Co_3O_4$.

The batch ingredients were melted to form a molten glass as in EXAMPLE 1. A ½ inch diameter metal rod was used to draw a rod of glass, about ⅜ inch in diameter from both melts. The glass rods, about 12 inches long, were put through an oven at about 680° to about 830°C over an approximate 2 hour period. The resulting glass-ceramic ($Li_2O$—$MgO$—$SiO_2$) systems were substantially homogeneous micro-crystalline masses of about 85 volume percent ceramic in a glass matrix and had coefficients of thermal expansion of about $11 \times 10^{-6}$ in/in/°C.

The resulting Batch A rod crystallized well and did not crack. The Knoop hardness of this rod (2.0 weight percent MgO) was about 660 for the ceramic crystal phase.

The resulting Batch B rod cracked during recrystallization. This was attributed to the use of 15.2 weight percent MgO in the batch composition. The Knoop hardness of this rod was over about 680 for the ceramic crystal phase.

EXAMPLE 4

As a comparative example a glass-ceramic plug insulator housing with embedded stud was made without alkali oxide. A batch of powdered ingredients was mixed containing 153.4 gr. $SiO_2$, 72.6 gr. $Li_2CO_3$, 36.1 gr. $MgCO_3$ and 13 gr. $NH_4H_2PO_4$. This batch material yielded a product glass ceramic material consisting of 77.7 weight percent $SiO_2$, 14.9 weight percent $Li_2O$, 4.9 weight percent MgO, and 2.4 weight percent $P_2O_5$ with none of the alkali oxide required in the glass-ceramic product of this invention. The batch ingredients were melted to form a fluid glass as in EXAMPLE 1.

The molten glass composition was allowed to cool as in EXAMPLE 1 and then poured into a preheated graphite split mold containing a type 18-8 preheated, oxidized stainless steel bolt using the same mold and techniques as in EXAMPLE 1. The graphite mold and casting were then cooled, and the glass casting with embedded stainless steel bolt reinserted into the oven using the same times and temperatures and continuous gradual heating gradient as in EXAMPLE 1. The resulting glass-ceramic ($Li_2O$—MgO—$SiO_2$) system was a substantially homogeneous micro-crystalline mass of about 85 volume percent ceramic in a glass matrix and had a coefficient of thermal expansion of about $11 \times 10^{-6}$ in/in/°C.

The resulting opaque glass-ceramic housing with attached stainless hardware was not deformed or slumped, but did show cracking near the stainless bolt. This was attributed to the lack of alkali oxide in the material. Such cracks of course would not be acceptable for lightning arrester or bushing applications.

EXAMPLE 5

A batch of powered ingredients (Batch A) was mixed containing 57.2 gr. $Li_2CO_3$, 8.1 gr. $K_2CO_3$, 16.6 gr. $MgCO_3$, 122.1 gr. $SiO_2$, 2.2 gr. $Al(PO_3)_3$, 0.4 gr. $As_2O_3$ and 0.1 gr. $Co_3O_4$. This batch material yielded a very low $P_2O_5$ product glass ceramic material consisting of 14.4 weight percent $Li_2O$, 3.4 weight percent $K_2O$, 4.9 weight percent MgO, 75.7 weight percent $SiO_2$, 0.2 weight percent $Al_2O_3$, 1.1. weight percent $P_2O_5$, 0.2 weight percent $As_2O_3$ and 0.06 $Co_3O_4$.

A second batch of powered ingredients (Batch B) was mixed containing 53.8 gr. $Li_2CO_3$ 7.6 gr. $K_2CO_3$, 15.6 gr. $MgCO_3$, 114.9 gr. $SiO_2$, 0.3 gr. $As_2O_3$, 14.3 gr. $Al(PO_3)_3$ and 0.1 gr. $Co_3O_4$. This batch material yielded an excessively high $P_2O_5$ product glass ceramic material consisting of 13.3 weight percent $Li_2O$, 3.2 weight percent $K_2O$, 4.5 weight percent MgO, 70.1 weight percent $SiO_2$, 1.8 weight percent $Al_2O_3$, 7.0 weight percent $P_2O_5$, 0.2 weight percent $As_2O_3$ and 0.06 weight percent $Co_3O_4$.

The batch ingredients were melted to form a molten glass as in EXAMPLE 1. A ½ inch diameter metal rod was used to draw a rod of glass about ⅜ inch in diameter, from both melts. The glass rods about 12 inches long were put through an oven at about 680°C to about 830°C over an approximate 2 hour period. The resulting glass-ceramic ($Li_2O$—MgO—$SiO_2$) systems were only partly crystallized ceramics. Batch A contained about 50 volume percent ceramic in a glass matrix and Batch B contained about 60 volume percent ceramic in a glass matrix. Both rods showed evidence of slumping. This was attributed to the use of $P_2O_5$ nucleating agent in amounts below 1.5 weight percent and above 6 weight percent.

As can be seen from the examples, the ranges and particular combination of ingredients are critical to provide glass-ceramic housings that are shatterproof, and which will not slump or crack when bonded to associated metal components.

I claim:

1. A method of bonding a glass-ceramic material to a metal member comprising the steps of:
   A. forming a fluid glass composition consisting essentially of about 60 to 80 weight percent $SiO_2$, 12 to 20 weight percent $Li_2O$, 2 to 14 weight percent MgO, 1.5 to 6 weight percent $P_2O_5$, 1 to 7 weight percent of an alkali oxide selected from the group consisting of $K_2O$ and $Na_2O$ and their mixtures, 0 to 2 weight percent of a transition metal oxide selected from the group consisting of $Co_3O_4$, $MnO_2$, $Fe_2O_3$, $V_2O_5$ and $WO_3$ and their mixtures, 0 to 5 weight percent PbO, 0 to 2 weight percent $Al_2O_3$ and 0 to 1 weight percent $As_2O_3$;
   B. applying the glass composition directly to a metal member;
   C. cooling the glass to a temperature of below about 600°C;
   D. heating the glass and metal member up to a temperature of about 900°C at a rate of about 10°–80°C per hour, to form a glass-ceramic from the glass composition which intimately bonds directly to the metal member, said glass-ceramic being a substantially homogeneous microcrystalline mass of ceramic having a Knoop handness value of over about 660 in a glass matrix;
   E. maintaining the temperature of the glass-ceramic bonded metal member for about ½–10 hours;
   F. cooling the glass-ceramic bonded metal member to room temperature.

2. The method of claim 1, wherein the glass is formed in step (A) by heating at a temperature between about 1000° to 1500°C and the glass composition is applied to the metal member in step (B) by pouring the glass composition into a mold containing the metal member, to embed the metal member in the glass composition.

3. The method of claim 2, wherein the metal member has a coefficient of thermal expansion of between about $8 \times 10^{-6}$ in/in/°C and $18 \times 10^{-6}$ in/in/°C and the glass-ceramic bonded metal member is cooled in step (F) over about a 6 to 48 hour period.

4. The method of claim 3, wherein the mold is preheated and the metal member has a coefficient of thermal expansion of between about $8 \times 10^{-6}$ in/in/°C and $13 \times 10^{-6}$ in/in/°C, a relatively smooth surface and is oxidized before step (C) to form a dense oxide layer thereon having a thickness of between about 0.8 to about 10 microns.

5. The method of claim 3, wherein, in step (D) the $P_2O_5$ nucleates crystals of lithium phosphate which form sites for growth of lithium metasilicate crystals, which lithium metasilicate crystals in turn form sites for growth of lithium disilicate crystals and wherein the ceramic phase constitutes 60–95 volume percent of the glass-ceramic.

6. The method of claim 3, wherein the composition contains about 4–12 weight percent MgO, 2 to 4 weight percent $P_2O_5$ and 0 weight percent $Al_2O_3$.

7. The method of claim 4, wherein the oxidized metal member has a thin pre-glassed coating on the oxide layer.

* * * * *